United States Patent [19]

Kaieda et al.

[11] Patent Number: 5,712,332

[45] Date of Patent: Jan. 27, 1998

[54] METHOD FOR ABSORBING HEAT RADIATION

[75] Inventors: Osamu Kaieda; Takashi Yodoshi, both of Tsukuba; Ken Morita, Toyonaka; Michio Matsuura, Sanda, all of Japan

[73] Assignee: Nippon Shokubai Co., Osaka, Japan

[21] Appl. No.: 478,739

[22] Filed: Jun. 7, 1995

Related U.S. Application Data

[63] Continuation-in-part of Ser. No. 180,488, Jan. 12, 1994, abandoned.

[30] Foreign Application Priority Data

Jan. 13, 1993 [JP] Japan ............................. 5-4326

[51] Int. Cl.$^6$ .............................................. C08K 5/3495
[52] U.S. Cl. ......................... 524/88; 524/424; 524/494; 524/718; 428/500; 428/704
[58] Field of Search ........................ 524/88, 424, 494, 524/718; 428/500, 704

[56] References Cited

U.S. PATENT DOCUMENTS

| | | | |
|---|---|---|---|
| 3,291,746 | 12/1966 | Donoian et al. | 252/300 |
| 4,347,173 | 8/1982 | Merian et al. | 524/88 |
| 4,839,414 | 6/1989 | Baderke et al. | 524/88 |
| 5,177,200 | 1/1993 | Kluger et al. | 524/88 |

FOREIGN PATENT DOCUMENTS

| | | |
|---|---|---|
| 0 155 780 | 9/1985 | European Pat. Off. . |
| 0 373 643 | 6/1990 | European Pat. Off. . |
| 0 375 898 | 7/1990 | European Pat. Off. . |
| 0 523 959 | 1/1993 | European Pat. Off. . |
| 60-139757 | 7/1985 | Japan . |
| 60-215895 | 10/1985 | Japan . |
| 63-270765 | 11/1988 | Japan . |
| 4-81469 | 3/1992 | Japan . |
| 881469 | 3/1992 | Japan ........................ 524/88 |
| 4-339877 | 11/1992 | Japan . |

OTHER PUBLICATIONS

Chem. Abstr., 119:29981, Eur. Pat. Appl. EP 523,959, Jan. 20, 1993.

Chem. Abstr., 113:108094, Jpn. Kokai Tokkyo Koho JP 02 49,785, Feb. 20, 1990.

Chem. Abstr., 84:166258, Ger. Offen. 2,531,823, Feb. 5, 1976.

*Primary Examiner*—Kriellion S. Morgan
*Attorney, Agent, or Firm*—Foley & Lardner

[57] ABSTRACT

A method that includes mixing a resin and a phthalocyanine compound, provides a resin composition which is useful as a heat radiation-shielding material which is semi-transparent or transparent for visible light but blocks heat rays.

18 Claims, 2 Drawing Sheets

METHOD FOR ABSORBING HEAT RADIATION

CROSS REFERENCE

The present application is a continuation in part application of an application Ser. No. 08/180,488 filed on Jan. 12, 1994.

BACKGROUND OF THE INVENTION

1. Field of the Invention

The present invention relates to a method for absorbing heat radiation using a heat radiation-absorbing material which absorbs near infrared rays. Specifically, the present invention relates a method for absorbing heat radiation using a resin which contains a novel phthalocyanine compound which has excellent ability to absorb near infrared rays, excellent compatibility to resins, and excellent light fastness, with a superior effect to allow visible light rays to pass relatively easily while blocking heat rays, and therefore it may absorb heat radiation as a resin board, sheet, film fibers or a coating which is semi-transparent or transparent but blocks heat rays, for windows of buildings and vehicles, ceiling windows, doors, car garages, ceiling domes, gardening greenhouses, sunglasses, protective eyeglasses, and the like. In addition, it can absorb near infrared rays and convert it to heat, and therefore it can be used for heat-accumulation and heat-retaining as resin board, sheet, film fibers or coatings.

2. Related Art

In recent years, various uses have been proposed for heat radiation-absorbing materials which absorb near infrared rays, and ever more high-performance ones are in great demand in a method for absorbing heat radiation. As major uses thereof, the following may be mentioned.

Conventionally, materials such as methacrylic resins, polycarbonate resins, and the like, because of their excellent transparency and weatherability, have been used for the so-called grading of the windows of buildings and vehicles, ceiling windows, doors, ceiling domes, etc., but since they also have a high transmittance of the heat rays in sunlight, they create the disadvantage of increased temperature of the interior upon exposure to direct sunlight. For this reason, there have been desired materials which subdue the increase in the temperature of the interior while transmitting sufficient visible light.

Presently, green houses and plastic hot houses are widely used in the field of plant cultivation for the improvement of crop yields and the adjustment of harvesting periods. One of the issues faced here is the prevention of temperature increases in the interior, particularly during the summer. Also, light from the near infrared region is known to have an effect on the regulation of the growth of plants, and thus absorbers of the near infrared region are added for the purpose of such regulation. For these reasons, effective heat radiation-shielding sheets have been desired which essentially do not block the transmittance of visible light rays which are necessary for the growth of plants.

Presently, infrared rays are often used to drive and stop electrical appliances such as magnetic tape recorders and the like, but this requires blocking of the near infrared rays from the exterior, which creates another demand for infrared shields.

Infrared rays contained in sunlight and infrared rays contained in light rays emitted by computer terminal displays and during welding are harmful to human eyes. Therefore, sunglasses, general-purpose eyeglasses, contact lenses, protective eyeglasses and the like which have a heat radiation-shielding effect are in demand for the protection of human eyes.

On the other hand, films, sheet, fibers, etc. as heat-accumulating and heat-insulating materials, which use an effect of absorbing near infrared ray and converting the same to heat are also sought. Among them since heat-accumulating and heat-insulating fibers can be used as clothes for cold weather etc., which requires heat-insulating property, various methods for constructing heat-accumulating and heat-insulating fibers have been proposed. For example, a cloth is coated with resin or metal-containing resin, or films are laminated, so as to lower air-permeability and to decrease heat loss by convection resulting in an increase of heat-insulation. However, such methods use only heat radiating from the human body, and their heat-insulating property is limited. Accordingly, heat-accumulating and heat-insulating fibers having high heat ray absorbing effect are sought.

Thus, a number of proposals have been offered in the past for heat radiation-absorbing materials. The resins used in such cases include transparent polycarbonate resins, acrylic resins, vinyl chloride resins, etc. depending on the purpose. On the other hand, as additives which absorb heat rays, there are known a large number of dyes and pigments with near infrared region-absorbing properties, and materials have been proposed which employ them. However, all of these are accompanied by the disadvantage of poor transparency due to their strong absorption of the visible light region.

To overcome the above mentioned problems, there has been proposed, for example in Japanese Examined Patent Application No. 62-5190, a method of adding dyes with only slight absorbance in the visible light region, but since the ability of these dyes to absorb near infrared rays is poor, they must be added in large amounts, and this creates the disadvantage of lower transmittance of visible light rays, thus impairing the transparency of the material. Also, in Japanese Unexamined Patent Application Nos. 51-135886, 61-80106 and 62-903 there are proposed methods of adding pigments which absorb light in the near infrared region, but the disadvantages of their poor solubility and poor compatibility to resins lead to problems in achieving uniformity, and as a result their uses are limited.

In addition, in Japanese Unexamined Patent Application No. 63-106735, etc. there is proposed a material incorporating an inorganic pigment, but despite its heat radiation-absorbing effect it transmits absolutely no visible light, and thus its uses are limited. Furthermore, in Japanese Unexamined Patent Application Nos. 1-161036 and 3-227366, etc. there are proposed methods of adding tungsten hexachloride and the like. However, although these methods provide good heat radiation-shielding effects, they are hampered by poor light stability, and in addition their high cost limits the fields in which they may be used.

Further, as may be seen in Japanese Examined Patent Application 43-25335, the use of infrared absorbers comprising organic colorings has been considered, and heat radiation-shielding materials which employ these infrared absorbers are transparent and easily processed. However, as described in Japanese Examined Patent Application 43-25335, decomposition of organic infrared absorbers usually occurs at temperatures of over 200° C., and thus their restrictions from the point of view of handling include that their use is essentially restricted to cast polymers.

To overcome the problem of heat resistance of infrared absorbers, as may be seen for example in Japanese Unexamined Patent Application 3-161644, methods have been devised for the preparation of films by adding infrared absorbers with low heat resistance temperatures to transparent resins with low molding temperatures, and the forming of thermal laminates onto transparent resin boards with high molding temperatures, etc. However, these methods in essence do not provide a solution to the problem of heat resistance of the infrared absorbers. In addition, films which contain such infrared absorbers are formed by cast polymerization, and thus are rather expensive.

SUMMARY OF THE INVENTION

The present invention was accomplished in light of the above mentioned circumstances of the prior art. That is, it is an object of the present invention to provide a method for absorbing heat radiation using a low-cost, heat radiation-absorbing material which selectively absorbs light in the near infrared region, and which can effectively absorb the heat from sunlight while providing a relatively high transmittance of the visible region. In other words, the present invention was accomplished with an aim to provide a method for absorbing heat radiation using a material which exhibits an excellent effect as a heat radiation-absorbing material, by developing a transparent resin containing a novel phthalocyanine compound which has excellent ability to selectively absorb near infrared rays and excellent affinity to resins.

It is a further object of the present invention to provide a method for absorbing heat radiation using heat radiation-absorbing materials which may be used in a wide variety of fields, by using only low-cost organic materials as the components composing the heat radiation-shielding materials.

Also, since the phthalocyanine compounds according to the present invention exhibit favorable heat resistance, heat radiation-absorbing materials may be prepared by highly productive molding methods such as injection molding, extrusion molding and the like, utilizing commonly used thermoplastic resins.

In order to overcome the above mentioned problems, the present invention provides a method for absorbing heat radiation using a heat radiation-absorbing material comprising a resin which contains a phthalocyanine compound represented by the following general formula I:

wherein $Z^1$–$Z^{16}$ independently represent $SR^1$, $OR^2$, a hydrogen atom, a halogen atom, or NHY wherein Y independently represents a phenyl group which may have a substituent or an alkyl group of 1–8 carbon atoms; $R^1$ and $R^2$ independently represent a phenyl group which may have a substituent selected from the group consisting of 1–3 alkyl groups having 1 to 4 carbon atoms, 1 or 2 alkoxy groups having 1 to 4 carbon atoms, 1 or 2 alkoxy carbonyl groups having 1 to 8 carbon atoms and 1 to 5 halogen atoms, or an alkyl group having 1–20 carbon atoms; and M represents metal, metal oxide, metal halide or two hydrogen atoms; provided that at least one of $Z^1$–$Z^{16}$ is NHY.

DETAILED DESCRIPTION

In the general formula I according to the present invention, the halogen atom may be fluorine, chlorine, bromine, etc., and of these halogen atoms, fluorine is preferred. By using fluorine, an effect towards improved compatibility to the resin is achieved.

The alkyl group having 1–8 carbon atoms may be methyl, ethyl, n-propyl, isopropyl, n-butyl, isobutyl, tert-butyl, or linear or branched pentyl, hexyl, cyclohexyl, heptyl, or octyl or etc. The alkyl group having 1–20 carbon atoms include, in addition to the above-mentioned alkyl groups, nonyl, decyl, dodecyl, undecyl, tridecyl, tetradecyl, pentadecyl, hexadecyl, heptadecyl, octadecyl, nonadecyl, eicosyl, etc.

The phenyl group having a substituent may be a phenyl group which is substituted with 1–3 alkyl groups having 1–4 carbon atoms, a phenyl group which is substituted with 1–2 alkoxy groups having 1–4 carbon atoms, a phenyl group having one or two alkoxycarbonyl groups which have 1 to 8 carbon atoms, or a phenyl group which is substituted with 1–5 halogen atoms such as chlorine, fluorine, etc.

The M in the general formula (1) is, for example, a metal such as copper, zinc, cobalt, nickel, iron, vanadium, titanium, indium, tin, palladium, aluminum, etc.; metal oxide such as vanadyl, titanyl, etc.; metal halide such as a fluoride, chloride, bromide or iodide, or two hydrogen atoms. Preferably, as the M is used copper, zinc, cobalt, nickel, iron, vanadyl, titanyl, chloroindium or dichlorotin, and particularly preferable for use are copper, zinc, cobalt, vanadyl and dichlorotin, which provide good light resistance. Vanadyl having high heat ray-absorbing ability is further preferable.

NHY in the phthalocyanine compounds represented by the above mentioned general formula I represents a phenylamino group or alkylamino group which may have a substituent, and it is an essential substituent. That is, at least one, preferably more than 4, more preferably more than 6 of $Z^1$–$Z^{16}$ are NHY, and into the remaining positions are introduced substituents selected from the group consisting of phenylthio and alkylthio groups which may have a substituent, represented by $SR^1$; phenyloxy and alkyloxy groups which may have a substituent, represented by $OR^2$; hydrogen atom and/or halogen atom.

As the number of substituents NHY is greater, the heat radiation-absorbing property becomes higher, and therefore larger number of NHY is preferred. In addition, phthalocyanine compounds wherein the NHY is an anylino group is especially preferable because light-resistance and heat resistance are high.

Even more preferably, in the phthalocyanine compound, at least one, preferably more than 4, more preferably more than 6 of $Z^1$ to $Z^{16}$ are NHY, and the total number of the substituents NHY, $SR^1$, $SR^2$ and halogen atom is 9 or more. These phthalocyanine compounds have high compatibility with resins. Especially those phthalocyanine compounds wherein at least 4 substituents are halogen atom or $OR^2$ have good compatibility with resins.

Still more preferably, in the phthalocyanine compounds, at least 4, preferably more than 6 of $Z^2$, $Z^3$, $Z^6$, $Z^7$, $Z^{10}$, $Z^{11}$, $Z^{14}$ and $Z^{15}$ are NHY. These phthalocyanine compounds have better light resistance.

Especially those phthalocyanine compounds wherein at least 4 substituents are fluorine atom. These phthalocyanine compounds are advantageous in all points, i.e., heat radiation-absorbing ability, light resistance, heat resistance and compatibility with resins as well as easy production.

As concrete examples of the phthalocyanine skeleton in the above general formula I may be mentioned the following group of compounds. In this group of compounds, Pc represents the phthalocyanine skeleton, and Y, $R^1$ and $R^2$ represent the same species as indicated above in general formula I. Also, the 3,6 positions below indicate substituents at the α positions ($Z^1$, $Z^4$, $Z^5$, $Z^8$, $Z^9$, $Z^{12}$, $Z^{13}$ and $Z^{16}$) of the phthalocyanine skeleton, and the 4,5 positions below indicate substituents at the β positions ($Z^2$, $Z^3$, $Z^6$, $Z^7$, $Z^{10}$, $Z^{11}$, $Z^{14}$ and $Z^{15}$) of the phthalocyanine skeleton. In the case where the 3,6-positions and the 4,5-positions are distinguished, the "Pc" is followed by substituent at the 4,5-positions in the first brackets [ ], which is followed by substituent at the 3,6-positions in the second brackets [ ].

Specific examples of the phthalocyanine compounds to be used according to the present invention are provided below. Note in the exemplified compounds, ethoxycarbonyl is represented by "ec", methylanylino group is represented by "TolNH", and dimethylanylino group is represented by "XyNH".

Group 1 Type Pc(NHY)8X8(X=halogen)
    octakis(anilino)-octafluorophthalocyanine Abbreviation: Pc(PhNH)8F8
    octakis(o-toluidino)-octafluorophthalocyanine Abbreviation: Pc(o-TolNH)8F8
    octakis(p-toluidino)-octafluorophthalocyanine Abbreviation: Pc(p-TolNH)8F8
    octakis(m-toluidino)-octafluorophthalocyanine Abbreviation: Pc(m-TolNH)8F8
    octakis(2,4-xylidino)-octafluorophthalocyanine Abbreviation: Pc(2,4-XyNH)8F8
    octakis(2,6-xylidino)-octafluorophthalocyanine Abbreviation: Pc(2,6-XyNH)8F8
    octakis(o-methoxyanilino)-octafluorophthalocyanine Abbreviation: Pc(o-MeOPhNH)8F8
    octakis(p-methoxyanilino)-octafluorophthalocyanine Abbreviation: Pc(p-MeOPhNH)8F8
    octakis(m-methoxyanilino)-octafluorophthalocyanine Abbreviation: Pc(m-MeOPhNH)8F8
    octakis(o-fluoroanilino)-octafluorophthalocyanine Abbreviation: Pc(o-FPhNH)8F8
    octakis(p-fluoroanilino)-octafluorophthalocyanine Abbreviation: Pc(p-FPhNH)8F8
    octakis(2,3,5,6-tetrafluoroanilino)-octafluorophthalocyanine Abbreviation: Pc(F4PhNH)8F8
    octakis(o-ethoxycarbonylanilino)-octafluorophthalocyanine Abbreviation: Pc(o-eCPhNH)8F8
    octakis(p-ethoxycarbonylanilino)-octafluorophthalocyanine Abbreviation: Pc(p-eCPhNH)8F8
    octakis(m-ethoxycarbonylanilino)-octafluorophthalocyanine Abbreviation: Pc(m-eCPhNH)8F8
    octakis(methylamino)-octafluorophthalocyanine Abbreviation: Pc(MeNH)8F8
    octakis(ethylamino)-octafluorophthalocyanine Abbreviation: Pc(EtNH)8F8
    octakis(butylamino)-octafluorophthalocyanine Abbreviation: Pc(BuNH)8F8
    octakis(octylamino)-octafluorophthalocyanine Abbreviation: Pc(OctNH)8F8
    4,5-(heptakisanilinomonofluoro)3,6-(monoanilinheptafluoro)phthalocyanine Abbreviation: Pc[(PhNH)7F1][(PhNH)1F7)]
    4,5-(hexakisanilino-difluoro)-3,6(bisanilinohexafluoro) phthalocyanine Abbreviation: Pc[(PhNH)6F2][(PhNH)2F6]
    4,5-(pentakisanilino-trifluoro)-3,6-(trisanilinopentafluoro)phthalocyanine Abbreviation: Pc[(PhNH)5F3][(PhNH)3F5]
    4,5-octakisanilino-3,6-octafluorophthalocyanine Abbreviation: Pc[(PhNH)8][F8]
    octakis(anilino)-octachlorophthalocyanine Abbreviation: Pc(PhNH)8Cl8
    octakis(butylamino)-octachlorophthalocyanine Abbreviation: Pc(BuNH)8Cl8

Group 2 Type Pc(NHY)4X12 (X=halogen)
    4-tetrakis(anilino)-3,5,6-dodecafluorophthalocyanine Abbreviation: Pc[(PhNH)4 F4][F8]
    4-tetrakis(butylamino)-3,5,6-dodecafluorophthalocyanine Abbreviation: Pc[(BuNH)4 (F4)][F8]
    4-tetrakis(octylamino)-3,5,6-dodecafluorophthalocyanine Abbreviation: Pc[(OctNH)4 (F4)][F8]
    4-tetrakis(p-toluidino)-3,5,6-dodecafluorophthalocyanine Abbreviation: Pc[(p-TolNH)4 F4][F8]
    4-tetrakis(o-methoxyanilino)-3,5,6-dodecafluorophthalocyanine Abbreviation: Pc[(o-MeOPhNH)4 F4][F8]
    4-tetrakis(p-fluoroanilino)-3,5,6-dodecafluorophthalocyanine Abbreviation: Pc[(P-FPhNH)4 F4][F8]
    4-tetrakis(anilino)-3,5,6-dodecachlorophthalocyanine Abbreviation: Pc[(PhNH)4 Cl4][Cl8]
    4-tetrakis(butylamino)-3,5,6,-dodecachlorophthalocyanine Abbreviation: Pc[(BuNH)4 Cl4][Cl8]

Group 3 Type Pc(NHY)8 $(OR^2)$8 (cases in which 1–3 unsubstituted halogens remain are also included in this group)
    octakis(anilino)-octakis(phenoxy)phthalocyanine Abbreviation: Pc(PhNH)8 (PhO)8
    octakis(anilino)-octakis(o-methylphenoxy) phthalocyanine Abbreviation: Pc(PhNH)8 (o-MePhO)8
    octakis(anilino)-octakis(p-ethoxyphenoxy) phthalocyanine Abbreviation: Pc(PhNH)8 (p-EtOPhO)8
    octakis(anilino)-octakis(n-butoxy)phthalocyanine Abbreviation: Pc(PhNH)8 (BuO)8
    octakis(anilino)-octakis(octyloxy)phthalocyanine Abbreviation: Pc(PhNH)8 (OctO)8 octakis(p-methoxyanilino)-octakis(phenoxy) phthalocyanine Abbreviation: Pc(p-MeOPhNH)8 (PhO)8 octakis(cyclohexylamino)-octakis(phenoxy) phthalocyanine Abbreviation: Pc(cy-HexPhNH)8 (PhO)8 octakis(n-butylamino)-octakis(phenoxy)phthalocyanine Abbreviation: Pc(BuNH)8 (PhO)8 octakis(n-butylamino)-octakis(n-butoxy)phthalocyanine Abbreviation: Pc(BuNH)8 (BuO)8

4,5-(heptakisanilino-monophenoxy-3,6-(monoanilino-heptakisphenoxy)phthalocyanine Abbreviation: Pc[(PhNH)7 (PhO)1][(PhNH)1 (PhO)7]

4,5-(hexakisanilino-bisphenoxy)-3,6-(bisanilino-hexakisphenoxy)phthalocyanine Abbreviation: Pc[(PhNH)6 (PhO)2][(PhNH)2 (PhO)6]

4,5-(pentakisanilino-trisphenoxy)-3,6-(trisanilino-pentakisphenoxy)phthalocyanine Abbreviation: Pc[(PhNH)5 (PhO)3][(PhNH)3 (PhO)5]

4,5-octakisanilino-3,6-octaphenoxyphthalocyanine Abbreviation: Pc[(PhNH)8][(PhS)8]

Group 4 Type Pc(NHY)4 (OR$^2$)12 (cases in which 1–3 unsubstituted halogens remain are also included in this group)

4-tetrakis(anilino)-3,5,6-dodecakis(phenoxy) phthalocyanine Abbreviation: Pc[(PhNH)4 (PhO)4][(PhO)8]

4-tetrakis(anilino)-3,5,6-dodecakis(p-methylphenoxy) phthalocyanine Abbreviation: Pc[(PhNH)4(p-MePho)4][(p-MetPhO8]

4-tetrakis(anilino)-3,5,6-dodecakis(p-ethylphenoxy) phthalocyanine Abbreviation: Pc[(PhNH)4(p-EtPhO)4][(p-EtPhO)8]

4-tetrakis(anilino)-3,5,6-dodecakis(p-ethoxyanilino) phthalocyanine Abbreviation: Pc[(PhNH)4(o-EtOPhO)4][(o-EtOPhO)8]

4-tetrakis(anilino)-3,5,6-dodecakis(p-butoxyphenoxy) phthalocyanine Abbreviation: Pc[(PhNH)4(p-BuOPhO)4][(p-BuPhO)8]

4-tetrakis(anilino)-3,5,6-dodecakis(p-fluorophenoxy) phthalocyanine Abbreviation: Pc[(PhNH)4(p-FPhO)4][(p-FPhO)8]

4-tetrakis(anilino)-3,5,6-dodecakis(2,4-difluorophenoxy) phthalocyanine Abbreviation: Pc[(PhNH)4(2,4-FPhO)4][(2,4-FPhO)8]

4-tetrakis(anilino)-3,5,6-dodecakis(2,3,5,6-tetrafluorophenoxy)phthalocyanine Abbreviation: Pc[(PhNH)4(F4PhO)4][(2,4-FPhO)8]

4-tetrakis(anilino)-3,5,6-dodecakis(o-chlorophenoxy) phthalocyanine Abbreviation: Pc[(PhNH)4(o-ClPhO)4][(o-ClPhO)8]

4-tetrakis(anilino)-3,5,6-dodecakis(ethoxy) phthalocyanine Abbreviation: Pc[(PhNH)4(EtO)4][(EtO)8]

4-tetrakis(anilino)-3,5,6-dodecakis(n-butoxy) phthalocyanine Abbreviation: Pc[(PhNH)4(BuO)4][(BuO)8]

4-tetrakis(anilino)-3,5,6-dodecakis(n-octyloxy) phthalocyanine Abbreviation: Pc[(PhNH)4(OctO)4][(OctO)8]

4-tetrakis(anilino)-3,5,6-dodecakis(n-dodecyloxy) phthalocyanine Abbreviation: Pc[(PhNH)4(DodO)4][(DodO)8]

4-tetrakis(anilino)-3,5,6-dodecakis(cyclohexyloxy) phthalocyanine Abbreviation: Pc[(PhNH)4(cy-HexO)4][(cy-HexO)8]

4-tetrakis(o-toluidino)-3,5,6-dodecakis(phenoxy) phthalocyanine Abbreviation: Pc[(o-TolNH)4(Pho)4][(PhO)8]

4-tetrakis(o-toluidino)-3,5,6-dodecakis(n-butoxy) phthalocyanine Abbreviation: Pc[(o-TolNH)4(BuO)4][(BuO)8]

4-tetrakis(p-toluidino)-3,5,6-dodecakis(phenoxy) phthalocyanine Abbreviation: Pc[(p-ToNH)4(PhO)4][(PhO)8]

4-tetrakis(p-toluidino)-3,5,6-dodecakis(o-methylphenoxy)phthalocyanine Abbreviation: Pc[(p-TolNH)4(o-MePhO)4][(o-MePho)8]

4-tetrakis(p-methoxyanilino)-3,5,6-dodecakis(phenoxy) phthalocyanine Abbreviation: Pc[(P-MeOPhNH)4 (PhO)4][(PhO)8]

4-tetrakis(p-ethoxyanilino)-3,5,6-dodecakis(phenoxy) phthalocyanine Abbreviation: Pc[(p-EtOPhNH)4(PhO)4][(PhO)8]

4-tetrakis(2,3,5,6-tetrafluoroanilino)-3,5,6-dodecakis (phenoxy)phthalocyanine Abbreviation: Pc[(F4PhNH)4(PhO)4][(PhO)8]

4-tetrakis(ethylamino)-3,5,6-dodecakis(phenoxy) phthalocyanine Abbreviation: Pc[(EtNH)4(PhO)4][(PhO)8]

4-tetrakis(n-butylamino)-3,5,6-dodecakis(phenoxy) phthalocyanine Abbreviation: Pc[(BuNH)4 (PhO)4][(PhO)8]

Group 5 Type Pc(NHY)8 H8

4,5-octakis(anilino)phthalocyanine Abbreviation: Pc[(PhNH)8][H8]

4,5-octakis(o-toluidino)phthalocyanine Abbreviation: Pc[(o-TolNH)8][H8]

4,5-octakis(p-toluidino)phthalocyanine Abbreviation: Pc[(p-TolNH)8][H8]

4,5-octakis(butylamino)phthalocyanine Abbreviation: Pc[(BuNH)8][H8]

4,5-octakis(2,4-xylidino)phthalocyanine Abbreviation: Pc[(2,4-XyNH)8][H8]

4,5-octakis(2,6-xylidino)phthalocyanine Abbreviation: Pc[(2,6-XyNH)8][H8]

4,5-octakis(o-methoxyanilino)phthalocyanine Abbreviation: Pc[(o-MeOPhNH)8][H8]

4,5-octakis(2,3,5,6-tetrafluoroanilino)phthalocyanine Abbreviation: Pc[(F4PhNH)8][H8]

4,5-octakis(o-ethoxycarbonylanilino)phthalocyanine Abbreviation: Pc[(o-eCPhNH)8][H8]

4,5-octakis(octylamino)phthalocyanine Abbreviation: [Pc(OctNH)8][H8]

Group 6 Type Pc(NHY)4 H12

4-tetrakis(anilino)phthalocyanine Abbreviation: Pc[(PhNH)4 H4][H8]

4-tetrakis(butylamino)phthalocyanine Abbreviation: Pc[(BuNH)4 H4][H8]

4-tetrakis(p-toluidino)phthalocyanine Abbreviation: Pc[(p-TolNH)4 H4]-[H8]

4-tetrakis(o-methoxyanilino)phthalocyanine Abbreviation: Pc[(o-MeOPhNH)4 H4][H8]

4-tetrakis(octylamino)phthalocyanine Abbreviation: Pc[(OctNH)4 H4][H8]

Group 7 Type Pc(NHY)8 (SR$^1$)8 octakis(anilino)-octakis(phenylthio)phthalocyanine Abbreviation: Pc(PhNH)8 (PhS)8 octakis(anilino)-octakis(o-methylphenylthio) phthalocyanine Abbreviation: Pc(PhNH)8 (o-MePhS)8 octakis(anilino)-octakis(p-ethoxyphenylthio) phthalocyanine Abbreviation: Pc(PhNH)8 (p-EtOPhS)8 octakis(anilino)-octakis(p-chlorphenylthio) phthalocyanine Abbreviation: Pc(PhNH)8 (p-ClPhS)8 octakis(anilino)-octakis(ethylthio)phthalocyanine Abbreviation: Pc(PhNH)8 (EtS)8 octakis(anilino)-octakis(n-butylthio)phthalocyanine Abbreviation: Pc(PhNH)8 (BuS)8 octakis(anilino)-octakis(n-dodecylthio)phthalocyanine Abbreviation: Pc(PhNH)8 (DodS)8 octakis(o-toluidino)-octakis(phenylthio)phthalocyanine Abbreviation: Pc(o-TolNH)8 (PhS)8 octakis(p-methoxyanilino)-octakis(phenylthio) phthalocyanine Abbreviation: Pc(p-MeOPhNH)8 (PhS)8 octakis(cyclohexylamino)-octakis(phenylthio) phthalocyanine Abbreviation: Pc(cy-HexPhNH)8 (PhS)8 octakis(n-butylamino)-octakis(phenylthio) phthalocyanine Abbreviation: Pc(BuNH)8 (PhS)8 octakis(n-butylamino)-octakis(p-tert-butyl-phenylthio) phthalocyanine Abbreviation: Pc(BuNH)8 (p-tertBuPhS)8 octakis(n-butylamino)-octakis(n-butylthio) phthalocyanine Abbreviation: Pc(BuNH)8 (BuS)8 octakis(n-octylamino-octakis(phenylthio)phthalocyanine Abbreviation: Pc(OctNH)8 (PhS)8 4,5-(heptakisanilino-monophenylthio-3,6-(monoanilino-heptakisphenylthio)phthalocyanine Abbreviation: Pc[(PhNH)7(PhS)1][(PhNH)1(PhS)7] 4,5-(hexakisanilino-bisphenylthio)-3,6-(bisanilino-hexaphenylthio)phthalocyanine Abbreviation: Pc[(PhNH)6(PhS)2][(PhNH)2(PhS)6] 4,5-(pentakisanilino-triphenylthio)-3,6-(trianilino-pentakisphenylthio)phthalocyanine Abbreviation: Pc[(P-hNH)5(PhS)3][(PhNH3)(PhS)5] 4,5-octakisanilino-3,6-octakisphenylthio phthalocyanine Abbreviation: Pc[(PhNH)8][(PhS)8]

Group 8 Type Pc(NHY)4 (SR$^1$)12

4-tetrakis(anilino)-3,5,6-dodecakis(phenylthio) phthalocyanine Abbreviation: Pc[(PhNH)4 (PhS)4[(PhS)8]

4-tetrakis(anilino)-3,5,6-dodecakis(o-methylphenylthio) phthalocyanine Abbreviation: Pc[(PhNH)4 (o-MePhS)4][(o-MePhS)8]

4-tetrakis(anilino)-3,5,6-dodecakis(p-methylphenylthio) phthalocyanine Abbreviation: Pc[(PhNH)4 (p-MePhS)4][(p-MePhS)8]

4-tetrakis(anilino)-3,5,6-dodecakis(p-ethylphenylthio) phthalocyanine Abbreviation: Pc[(PhNH)4 (p-EtPhS)4][(p-EtPhS)8]

4-tetrakis(anilino)-3,5,6-dodecakis(p-(n-butyl) phenylthio)phthalocyanine Abbreviation: Pc[(PhNH)4 (p-BuPhS)4][(p-BuPhS)8]

4-tetrakis(anilino)-3,5,6-dodecakis(p-fluorophenylthio) phthalocyanine Abbreviation: Pc[(PhNH)4 (p-FPhS)4][(p-FPhS)8]

4-tetrakis(anilino)-3,5,6-dodecakis(2,4-difluorophenylthio)phthalocyanine Abbreviation: Pc[(PhNH)4 (2,4-F2PhS)4][(2,4-F2PhS)8]

4-tetrakis(anilino)-3,5,6-dodecakis(2,3,5,6-tetrafluorophenylthio)phthalocyanine Abbreviation: Pc[(PhNH)4 (F4PhS)4][(F4PhS)8]

4-tetrakis(anilino)-3,5,6-dodecakis(o-chlorophenylthio) phthalocyanine Abbreviation: Pc[(PhNH)4 (o-ClPhS)4][(o-ClPhS)8]

4-tetrakis(anilino)-3,5,6-dodecakis(p-chlorophenylthio) phthalocyanine Abbreviation: Pc[(PhNH)4 (p-ClPhS)4][(p-ClPhS)8]

4-tetrakis(anilino)-3,5,6-dodecakis(2,4-dichlorophenylthio)phthalocyanine Abbreviation: Pc[(PhNH)4 (2,4-Cl2PhS)4][(2,4-ClPhS)8]

4-tetrakis(anilino)-3,5,6-dodecakis(methylthio) phthalocyanine Abbreviation: Pc[(PhNH)4 (MeS)4][(MeS)8]

4-tetrakis(anilino)-3,5,6-dodecakis(ethylthio) phthalocyanine Abbreviation: Pc[(PhNH)4 (EtS)4][(Et)8]

4-tetrakis(anilino)-3,5,6-dodecakis(n-butylthio) phthalocyanine Abbreviation: Pc[(PhNH)4 (BuS)4][(BuS)8]

4-tetrakis(anilino)-3,5,6-dodecakis(tert-butylthio) phthalocyanine Abbreviation: Pc[(PhNH)4 (tert-BuS)4][(tert-BuS)8]

4-tetrakis(anilino)-3,5,6-dodecakis(n-hexylthio) phthalocyanine Abbreviation: Pc[(PhNH)4 (HexS)4][(HexS)8]

4-tetrakis(anilino)-3,5,6-dodecakis(n-octylthio) phthalocyanine Abbreviation: Pc[(PhNH)4 (OctS)4][(OctS)8]

4-tetrakis(anilino)-3,5,6-dodecakis(n-dodecylthio) phthalocyanine Abbreviation: Pc[(PhNH)4 (DodS)4][(OodS)8]

4-tetrakis(anilino)-3,5,6-dodecakis(n-hexadecylthio) phthalocyanine Abbreviation: Pc[(PhNH)4 (HedS)4][(HedS)8]

4-tetrakis(anilino)-3,5,6-dodecakis(cyclohexylthio) phthalocyanine Abbreviation: Pc[(PhNH)4 (cy-HexS)4][(cy-HexS)8]

4-tetrakis(o-toluidino)-3,5,6-dodecakis(phenylthio) phthalocyanine Abbreviation: Pc[(o-TolNH)4 (PhS)4][(PhS)8]

4-tetrakis(o-toluidino)-3,5,6-dodecakis(o-methylphenylthio)phthalocyanine Abbreviation: Pc[(o-TolNH)4 (o-MePhS)4][(o-MePhS)8]

4-tetrakis(o-toluidino)-3,5,6-dodecakis(p-fluorophenylthio)phthalocyanine Abbreviation: Pc[(o-TolNH)4 (p-FPhS)4][(P-FPhS)8]

4-tetrakis(o-toluidino)-3,5,6-dodecakis(ethylthio) phthalocyanine Abbreviation: Pc[(o-TolNH)4 (EtS)4][(EtS)8]

4-tetrakis(o-toluidino)-3,5,6-dodecakis(n-octylthio) phthalocyanine Abbreviation: Pc[(o-TolNH)4 (OctS)4][(OctS)8]

4-tetrakis(o-toluidino)-3,5,6-dodecakis(phenylthio) phthalocyanine Abbreviation: Pc[(o-TolNH)4 (PhS)4][(PhS)8]

4-tetrakis(p-toluidino)-3,5,6-dodecakis(o-methylphenylthio)phthalocyanine Abbreviation: Pc[(p-TolNH)4 (p-MePhS)4][(p-MePhS)8]

4-tetrakis(p-toluidino)-3,5,6-dodecakis(phenylthio) phthalocyanine Abbreviation: Pc[(p-TolNH)4 (PhS)4][(PhS)8]

4-tetrakis(p-methoxyanilino)-3,5,6-dodecakis (phenylthio)phthalocyanine Abbreviation: Pc[(p-MeOPhNH)4 (PhS)4][(PhS)8]

4-tetrakis(p-ethoxyanilino)-3,5,6-dodecakis(phenylthio) phthalocyanine Abbreviation: Pc[(p-EtOPhNH)4 (PhS)4][(PhS)8]

4-tetrakis(p-ethoxyanilino)-3,5,6-dodecakis(butylthio) phthalocyanine Abbreviation: Pc[(p-EtOPhNH)4 (BuS)4][(BuS)8]

4-tetrakis(p-butoxyanilino)-3,5,6-dodecakis(phenylthio) phthalocyanine Abbreviation: Pc[(p-BuOPhNH)4 (PhS)4][(PhS)8]

4-tetrakis(p-chloroanilino)-3,5,6-dodecakis(phenylthio) phthalocyanine Abbreviation: Pc[(p-ClPhNH)4 (PhS)4][(PhS)8]

4-tetrakis(2,3,5,6-tetrafluoroanilino)-3,5,6-dodecakis (phenylthio)phthalocyanine Abbreviation: Pc[(F4PhNH)4 (PhS)4][(PhS)8]

4-tetrakis(ethylamino)-3,5,6-dodecakis(phenylthio) phthalocyanine Abbreviation: Pc[(EtNH)4 (PhS)4] [(PhS)8]

4-tetrakis(n-butylamino)-3,5,6-dodecakis(phenylthio) phthalocyanine Abbreviation: Pc[(BuNH)4 (PhS)4] [(PhS)8]

4-tetrakis(n-butylamino)-3,5,6-dodecakis(butylthio) phthalocyanine Abbreviation: Pc[(BuNH)4 (BuS)4] [(BuS)8]

4-tetrakis(cyclohexylamino)-3,5,6-dodecakis(phenylthio) phthalocyanine Abbreviation: Pc[(cy-HexNH)4 (PhS)4][(PhS)8]

4-tetrakis(cyclohexylamino)-3,5,6-dodecakis(butylthio) phthalocyanine Abbreviation: Pc[(cy-HexNH)4 (BuS)4][(Bus)8]

In addition, phthalocyanine compounds wherein the substituent groups described in the above-listed compounds randomly locate are effectively used in the present invention.

Among the compounds listed above, the compounds belonging to the Groups 1, 2, 3 and 4 are especially preferable, because these compounds have good compatibility with resins used and good heat resistance, and therefore can be extruded to spin fiber by adding to a resin at 220° to 250° C.

Particularly preferred of the above groups of compounds according to the present invention are Group (1) and Group (3). These groups of compounds have excellent ability to absorb heat rays as a result of their high absorbance particularly in the wavelength region of heat rays. Of Group (1), which is the most easily and practically produced among the Groups (1) and (3), those compounds wherein fluorine is used as the halogen atom are even more preferable. In addition, the compounds belonging to the Groups 1 and 3 wherein the NHY is anylino group are especially preferred, because these compound exhibit high light resistance and high heat resistance.

The resin to be used according to the present invention may be appropriately selected depending on the intended use for the resulting heat radiation-absorbing material, but resins which are essentially transparent and exhibit little absorbance and scattering are preferred. Concrete examples thereof include polycarbonate resins; (meth)acrylic resins such as methyl methacrylate, etc.; polystyrene; polyvinyl resins such as polyvinyl chloride, polyvinylidene chloride, etc.; polyolefinic resins such as polyethylene, polypropylene, etc.; polybutyral resins; vinyl acetate resins such as polyvinyl acetate, etc.; polyester resins; polyamide resins, and the like. Furthermore, use is not restricted to only one of the above mentioned resins so long as substantial transparency is maintained, and blends of 2 or more resins may be used, while the above mentioned resin containing a phthalocyanine compound may also be put between transparent glass sheets.

Of these resins are preferred polycarbonate resins, (meth) acrylic resins, polyester resins, polyethylene resins, polystyrene resins and polyvinyl chloride resins, which have excellent weatherability and transparency, and particularly preferred are polycarbonate resins, methacrylic resins, PET resins and polyvinyl chloride resins. Especially when used as heat-accumulating and heat insulating fibers, these resins containing a phthalocyanine may be preferably span to fibers.

The polycarbonate resin is produced by reacting a dihydric phenol with a carbonate precursor by the solution method or the melting method. Representative examples of dihydric phenols include the following.

2,2-bis(4-hydroxyphenyl)propane [bisphenol A], 1,1-bis (4-hydroxyphenyl)ethane, 1,1-bis(4-hydroxyphenyl) cyclohexane, 2,2-bis(4-hydroxy-3,5-dimethylphenyl) propane, 2,2-bis(4-hydroxy-3,5-dibromophenyl)propane, 2,2-bis(4-hydroxy-3-methylphenyl)propane, bis(4-hydroxyphenyl) sulfide, bis(4-hydroxyphenyl) sulfone, etc. Preferred dihydric phenols are bis(4-hydroxyphenyl) alkane-type ones, and particularly those consisting mainly of bisphenol.

The acrylic resin may be methyl methacrylate alone or a polymer of polymerizable unsaturated monomers containing 50% or more of methyl methacrylate, or a copolymer thereof. As polymerizable unsaturated monomers which are copolymerizable with methyl methacrylate may be mentioned, for example, the following. Methyl acrylate, ethyl (meth)acrylate (methyl acrylate and methyl methacrylate, same hereunder), butyl (meth)acrylate, cyclohexyl (meth)acrylate, 2-ethylhexyl (meth)acrylate, methoxyethyl (meth)acrylate, ethoxyethyl (meth)acrylate, 2-hydroxyethyl (meth)acrylate, N,N-diethylaminoethyl (meth)acrylate, glycidyl (meth)acrylate, tribromophenyl (meth)acrylate, tetrahydroxyfurfuryl (meth)acrylate, ethyleneglycol di(meth)acrylate, triethyleneglycol di(meth) acrylate, tripropyleneglycol di(meth)acrylate, trimethylolethane di(meth)acrylate, neopentylglycol di(meth)acrylate, trimethylolpropane tri(meth)acrylate, pentaerythritol tetra (meth)acrylate, etc.

As the vinyl chloride resin may be used not only polymers of vinyl chloride monomers alone, but also copolymers comprising mainly vinyl chloride. As monomers which may be copolymerized with vinyl chloride may be mentioned vinylidene chloride, ethylene, propylene, acrylonitrile, vinyl acetate, maleic acid, itaconic acid, acrylic acid, methacrylic acid, etc.

In carrying out the present invention, there may be added any of a number of additives which are commonly used for the production of transparent resin materials. As additives may be mentioned, for example, coloring agents, polymerization modifiers, antioxidants, ultraviolet absorbers, flame retardants, plasticizers, rubbers to improve shock resistance, release agents, etc.

Methods of molding a transparent resin mixture containing the above mentioned phthalocyanine compound include extrusion molding, injection molding, cast molding, press molding, calender molding, cast coating, and the like.

A film containing the phthalocyanine compound may be prepared and formed onto a transparent resin board or glass board by a heat press or heat laminator to prepare a heat radiation-absorbing sheet.

Furthermore, an acrylic resin ink or paint, etc. containing the phthalocyanine compound may be printed or coated onto a transparent resin board to obtain a heat radiation-shielding sheet.

Phthalocyanine compounds to be used according to the present invention have excellent heat resistance compared with commersially available infrared absorbers, and thus they may be molded using an acrylic resin, polycarbonate resin or PET resin by a molding method such as injection molding or extrusion molding in which the temperature of the resin is increased to high temperature of 220°–350° C., to obtain highly transparent molds with excellent heat radiation-absorbing properties.

There is also no problem with its use at molding temperatures of under 220° C.

There are no particular restrictions on the shape of the heat radiation-shielding material, as it may have any of a variety of shapes including, in addition to the most common flat board or film shapes, a corrugated, spherical or dome shape, etc.

The amount of the phthalocyanine compound to be used according to the present invention may be varied depending on the desired transmittance of the visible and near infrared regions for the heat radiation-shielding sheet as well as the thickness of the sheet, but normally the amount is 0.0005–20 parts by weight, and preferably 0.0015–10 parts by weight based on 100 parts by weight of the transparent resin.

The content thereof will differ depending on the shape of the heat radiation-shielding material, and for example, in the case of preparation of a heat radiation-shielding sheet of 3 mm thickness, a content of 0.002–0.06 parts by weight, and particularly 0.005–0.03 parts by weight, is preferred.

In the case of preparation of a heat radiation-shielding sheet of 10 mm thickness, the content is preferably 0.0005–0.02 wt %, and more preferably 0.0015–0.01 parts by weight. In the case of preparation of a heat radiation-shielding film of 10 µm thickness, the content is preferably 0.5–20 parts by weight, and more preferably 1.5–10 parts by weight. As an indication of the content of the phthalocyanine compound without regard to the thickness of the heat radiation-shielding material, considering the weight of the surface of projection from above, the content is preferably 0.06–2.4 $g/m^2$, and more preferably 0.18–1.2 $g/m^2$.

If the content of the phthalocyanine compound is less than 0.06 $g/m^2$ there will be less of a heat radiation-shielding effect, while if it exceeds 2.4 $g/m^2$ the cost will be considerably increased, and in some cases the transmittance of visible light will be too low.

For heteromorphic surfaces such as corrugated boards and the like, the weight may be considered as that of the surface of projection from above. Also, so long as there are no problems from the point of view of the appearance, the concentration distribution of the phthalocyanine compound may even be irregular. Furthermore, a mixture of different phthalocyanine compounds may be used, and when 2 or more compounds with different absorbance wavelengths are used, the heat radiation-shielding effect is accentuated.

In addition, by using a specific amount of carbon black with the phthalocyanine compound, the heat radiation-shielding effect is the same as when using the phthalocyanine compound alone while the amount of the phthalocyanine compound used may be reduced by half or more. Furthermore, the heat radiation-shielding effect is improved if the phthalocyanine compound is used in combination with a dye.

The content of carbon black in the heat radiation-shielding composition is 0.00007–3 parts by weight based on 100 parts by weight of the composition, but, similar to the content of the phthalocyanine compound, the most preferable content will differ greatly depending on the shape of the heat radiation-shielding material. For example, in the case of preparation of a heat radiation-shielding sheet of 3 mm thickness, the content is preferably 0.0002–0.008 parts by weight, and more preferably 0.001–0.004 parts by weight. In the case of preparation of a heat radiation-shielding sheet of 10 mm thickness, the content is preferably 0.00007–0.0025 parts by weight, and more preferably 0.0003–0.0013 parts by weight. In the case of preparation of a heat radiation-shielding film of 10 µm thickness, the content is preferably 0.07–3 parts by weight, and more preferably 0.3–1.5 parts by weight.

As an indication of the content of the carbon black without regard to the thickness of the heat radiation-shielding material, considering the weight of the surface of projection from above, the content is preferably 0.01–0.3 $g/m^2$, and more preferably 0.04–0.15 $g/m^2$.

If the content of the carbon black exceeds 0.3 $g/m^2$, then the entire light transmittance will be considerably low, while if it is less than 0.01 $g/m^2$ then it will be impossible to reduce the amount of the phthalocyanine compound to be added. The carbon black may be, for example, channel black, furnace black, thermal black, acetylene black, or the like.

Where phthalocyanine is used for a heat accumulating and heat insulating material, there is no special limitation to shape of the material, and as seen in the case of heat-shielding materials, resin containing the phthalocyanine compound can be shaped to plates or films. Fiber is most preferable.

A content of the present phthalocyanine compound is that which exhibits heat radiation absorbing effect, similarly to the case wherein the phthalocyanine compound is used as heat radiation shielding material. In addition, distribution of concentration of phthalocyanine can be irregular as far as the appearance is acceptable. More than one phthalocyanine can be used together, and when more than one phthalocyanine compounds having different absorption wave length is used, heat accumulating and heat insulating effect is enhanced.

EXAMPLES

A more concrete description is provided below with reference to the Examples.

Examples 1–10

To 100 parts by weight of a molten polycarbonate resin (trade name PANLITE 1285, product of Teijin Kasei, KK.) were added the phthalocyanine compounds listed in Table 1 in the amounts listed in Table 1, and sheets of 2 mm thickness were molded at 280° C. using a T die and an extruder. The visible light transmittance and heat radiation transmittance of the obtained sheets were measured.

The transmission spectrum and transmittance of the obtained sheets were measured using a spectrophotometer (UV-3100, product of K. K. Shimazu Seisakusho). Also, the values of the visible light transmittance (400 nm–800 nm) and the heat radiation transmittance (800 nm–1800 nm) of the heat radiation-shielding sheets were determined based on the standard of JIS R-3106

That is, the visible light transmittance values correspond to the solar radiation transmittance value at 400–800 nm obtained based on JIS R-3106, divided by 0.531, and the heat radiation transmittance values correspond to the solar radiation transmittance value of 400–800 nm obtained based on JIS R-3106, divided by 0.444. The energy distribution of the sunlight was 0.025 for the range of 340–400 nm, 0.531 for the range of 400–800 nm, and 0.444 for the range of 800–1800 nm. The range of 340–400 nm was omitted as it is in the ultraviolet range.

Comparative Example 1

Figure 1:
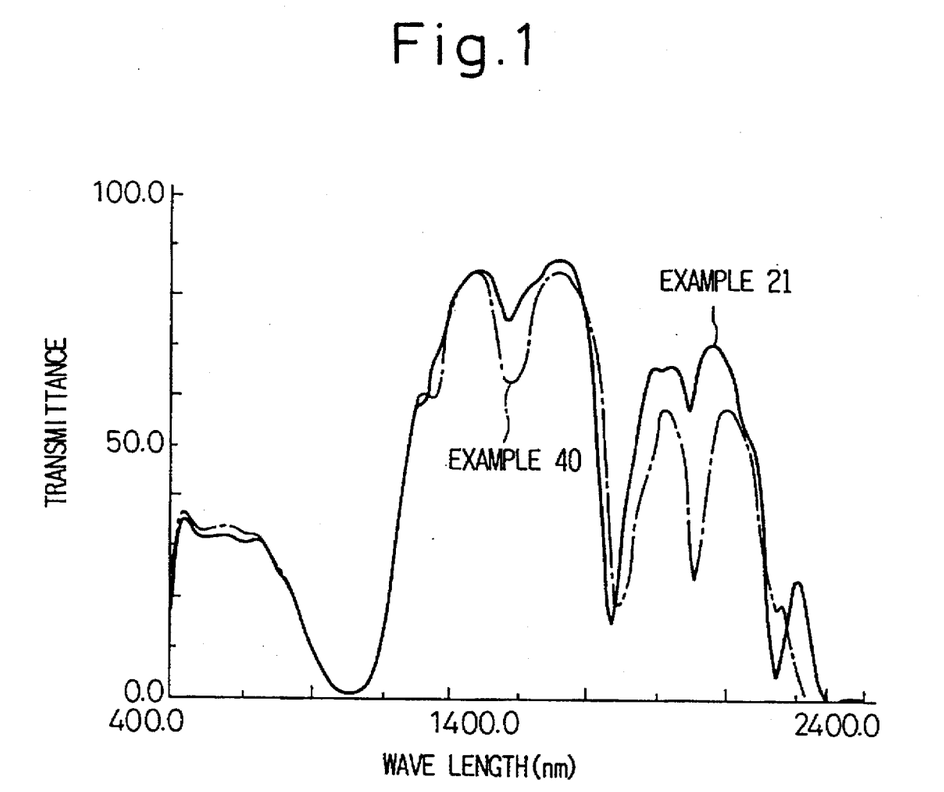
FIG. 1 is a chart showing the spectral transmittance of the molds obtained in Examples 21 and 40.

A composition was prepared in the same formulation as in Example 1 by the same procedure as in Example 1, but without adding the phthalocyanine compound as in Example 1, to obtain the results shown in Table 1.

measured. The spectral transmittance of the sheet obtained in Example 21 was measured and is shown in FIG. 1.

Comparative Example 2

The same procedure as in Example 11 was followed, except for the addition of 0.0022 parts of Kayaset Red A-2G and 0.0026 parts of Kayaset Green A-B as dyes (both dyes products of Nihon Kayaku, KK.) instead of the phthalocyanine compound in Example 11, to obtain the results shown in Table 2.

TABLE 1

| Phthalocyanine compound | | Molding | Thickness | Transmittance of visible light rays | Transmittance of heat rays |
|---|---|---|---|---|---|
| Abbreviation | Amount (wt %) | temperature (°C.) | of mold (mm) | (400–800 nm) (%) | (800–1800 nm) (%) |
| Example | | | | | |
| 1  VOPc(BuNH)$_8$F$_8$ | 0.003 | 280 | 2 | 78.9 | 62.4 |
| 2  VOPc(PhNH)$_8$(PhS)$_8$ | 0.002 | 280 | 2 | 80.1 | 65.4 |
| 3  ZnPc[(PhNH)$_8$][(PhO)$_8$] | 0.006 | 280 | 2 | 66.7 | 56.9 |
| 4  SnCl$_2$Pc(P—TolNH)$_4$F$_{12}$ | 0.001 | 280 | 2 | 81.6 | 69.6 |
| 5  CuPc(PhNH)$_8$(O—MeOPhS)$_8$ | 0.006 | 280 | 2 | 64.9 | 57.2 |
| 6  CoPc(PhNH)$_8$(BuO)$_8$ | 0.01 | 280 | 2 | 50.4 | 42.1 |
| 7  SnCl$_2$((O-ecPhNH)$_8$F$_8$ | 0.002 | 280 | 2 | 78.2 | 62.7 |
| 8  CuPc(MeO—PhNH)$_8$(BuS)$_8$ | 0.006 | 280 | 2 | 69.8 | 52.2 |
| 9  ZnPc[(HexNH)$_4$(F$_4$PhO)$_4$][(F$_4$PhO)$_8$] | 0.003 | 280 | 2 | 78.8 | 65.5 |
| 10  VOPc(BuNH)$_8$(BuS)$_8$ | 0.003 | 280 | 2 | 80.3 | 54.2 |
| Comparative Example | | | | | |
| 1  — | — | 280 | 2 | 89.2 | 84.6 |

Examples 11–21

To 100 parts by weight of a molten polycarbonate resin (trade name PANLITE 1285, product of Teijin Kasei, KK.) were added the phthalocyanine compounds listed in Table 2 in the amounts listed in Table 2, and pellets were prepared at 280° C. using an extruder and a pelletizer. Using the prepared pellets, 2 mm and 3 mm sheets were prepared at molding temperatures of 300° C. and 330° C., using an injection molding machine. The visible light transmittance and heat radiation transmittance of the obtained sheets were Comparative Example 3

The same procedure as in Comparative Example 2 was followed, except for increasing the amounts of the dyes in Comparative Example 2 from 0.0022 parts to 0.003 parts and from 0.0026 parts to 0.0035 parts, to obtain the results shown in Table 2.

TABLE 2

| Phthalocyanine compound | | Molding | Thickness | Transmittance of visible light rays | Transmittance of heat rays |
|---|---|---|---|---|---|
| Abbreviation | Amount (wt %) | temperature (°C.) | of mold (mm) | (400–800 nm) (%) | (800–1800 nm) (%) |
| Example | | | | | |
| 11  VOPc[(EtNH)$_4$(PhS)$_4$][(PhS)$_8$] | 0.02 | 300 | 3 | 33.8 | 56.4 |
| 12  CoPc[(PhNH)$_4$(PhS)$_4$][(PhS)$_8$] | 0.01 | 300 | 3 | 45.7 | 70.1 |
| 13  SnCl$_2$Pc[(OctNH)$_4$H$_4$][H$_8$] | 0.03 | 300 | 3 | 30.5 | 50.1 |
| 14  VOPc(BuNH)$_8$ | 0.005 | 300 | 3 | 57.3 | 46.7 |
| 15  ZnPc(PhNH)$_8$Cl$_8$ | 0.01 | 300 | 3 | 50.7 | 60.7 |
| 16  VOPc(PhNH)$_8$F$_8$ | 0.003 | 300 | 3 | 72.0 | 67.1 |
| 17  " | 0.01 | 300 | 2 | 47.3 | 46.7 |
| 18  " | 0.01 | 300 | 3 | 35.6 | 39.3 |
| 19  " | 0.02 | 330 | 2 | 26.0 | 36.0 |
| 20  " | 0.02 | 330 | 3 | 15.1 | 30.4 |

TABLE 2-continued

|  | Phthalocyanine compound | | Molding temperature (°C.) | Thickness of mold (mm) | Transmittance of visible light rays (400–800 nm) (%) | Transmittance of heat rays (800–1800 nm) (%) |
|---|---|---|---|---|---|---|
|  | Abbreviation | Amount (wt %) | | | | |
| 21 Comparative Example | " | 0.013 | 330 | 3 | 26.6 | 36.8 |
| 2 | — | — | 300 | 3 | 45.6 | 84.2 |
| 3 | — | — | 300 | 3 | 32.5 | 84.2 |

Examples 22–40

Between 2 pieces of hard glass was injected by a conventional method a mixture of 100 parts by weight of methyl methacrylate, 0.2 parts of azobisisobutylnitrile, 0.1 parts of a releasing agent (ZELEC UN, product of DuPont Co.) and each of the phthalocyanine compounds listed in Table 3 and 4 in the amounts listed in Tables 3 and 4, and the samples were immersed for 14 hours in a water bath at 65° C. Next, they were heated for 1 hour in an oven at 90° C. to the completion of polymerization. After polymerization was completed, they were peeled off of the glass to obtain transparent resin sheets of 3 mm thickness. The visible light transmittance and heat radiation transmittance of the obtained sheets were measured. The results are shown in Tables 3 and 4. The spectral transmittance of the sheet obtained in Example 40 was measured and is shown in FIG. 1.

Comparative Example 4

A composition was prepared in the same formulation as in Example 22 by the same procedure as in Example 22, but without adding phthalocyanine compounds used in Example 22, to obtain the results shown in Table 4.

Comparative Example 5

Figure 2:
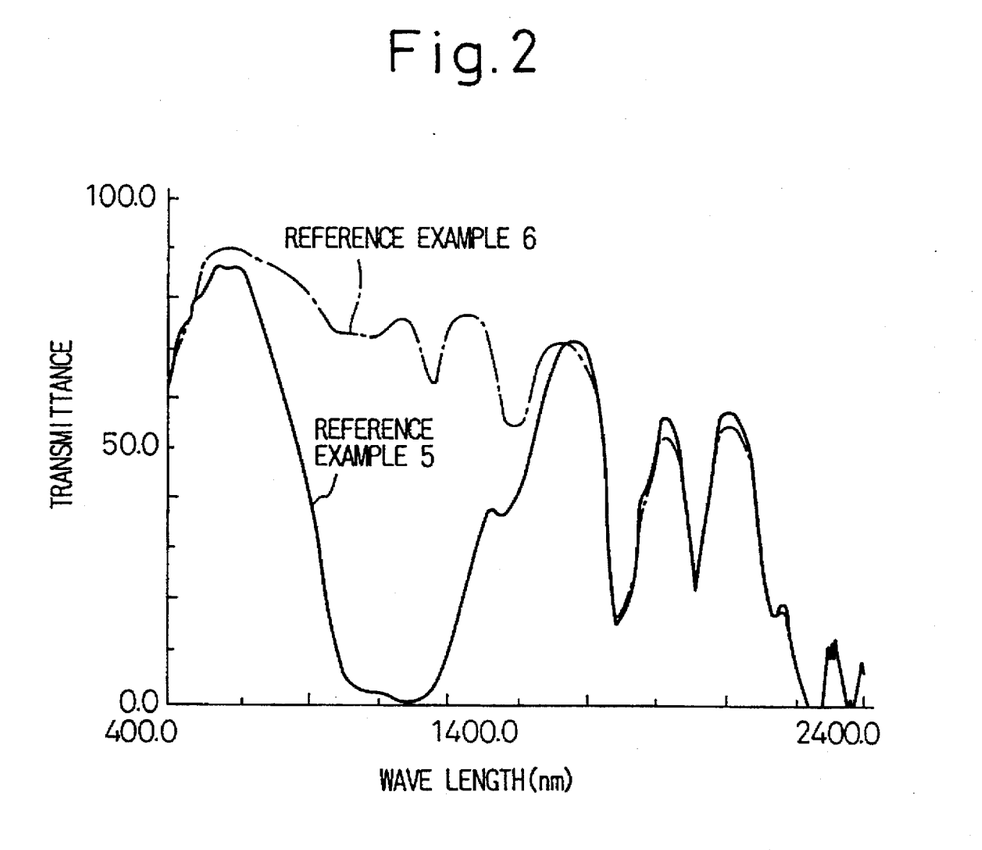
FIG. 2 is a chart showing the spectral transmittance of the molds obtained in Comparisons 5 and 6.

The same procedure as in Example 22 was followed, except for the addition of 0.01 parts of the infrared absorber Kayasorb IRG-022 (product of Nihon Kayaku, KK.) instead of the phthalocyanine compound in Example 22, to obtain the results shown in Table 4. The spectral transmittance of the obtained mold was measured and is shown in FIG. 2.

Comparative Example 6

To 100 parts by weight of a molten methacrylic resin (SUMIPEX B, product of Sumitomo Kagaku Kogyo, KK.) was added the same infrared absorber as in Comparison 5, a sheet of 3 mm thickness was molded at 250° C. using a T die and an extruder, and the results are shown in Table 4. The visible light transmittance and heat radiation transmittance of the obtained sheet were measured and are shown in FIG. 2.

TABLE 3

|  | Phthalocyanine compound | | Molding temperature (°C.) | Thickness of mold (mm) | Transmittance of visible light rays (400–800 nm) (%) | Transmittance of heat rays (800–1800 nm) (%) |
|---|---|---|---|---|---|---|
|  | Abbreviation | Amount (wt %) | | | | |
| Example | | | | | | |
| 22 | VOPc(OctNH)$_8$F$_8$ | 0.007 | 65–90 | 3 | 70.1 | 50.0 |
| 23 | VOPc(O—TolNH)$_8$(PhS)$_8$ | 0.005 | 65–90 | 3 | 82.3 | 59.8 |
| 24 | VOPc(BuNH)$_8$(P—EtoPhO)$_8$ | 0.007 | 65–90 | 3 | 68.7 | 53.4 |
| 25 | ZnPc[(PhNH)$_4$(PhO)$_4$][(PhO)$_8$] | 0.01 | 65–90 | 3 | 65.5 | 55.3 |
| 26 | ZnPc[(PhNH)$_8$][(PhS)$_8$] | 0.005 | 65–90 | 3 | 82.6 | 61.3 |
| 27 | CuPc(F4PhNH)$_8$(O—FPhS)$_8$ | 0.005 | 65–90 | 3 | 83.2 | 66.7 |
| 28 | CoPc(BuNH)$_8$(PhS)$_8$ | 0.007 | 65–90 | 3 | 73.3 | 60.6 |
| 29 | SnCl$_2$Pc(PhNH)$_4$F$_{12}$ | 0.007 | 65–90 | 3 | 72.9 | 61.5 |
| 30 | SnCl$_2$Pc(BuNH)$_8$(PhS)$_8$ | 0.068 | 65–90 | 3 | 73.2 | 53.6 |
| 31 | SnCl$_2$Pc(BuNH)$_8$(PhO)$_8$ | 0.1 | 65–90 | 3 | 67.9 | 51.2 |

TABLE 4

| | Phthalocyanine compound | | Molding | Thickness | Transmittance of visible light rays | Transmittance of heat rays |
|---|---|---|---|---|---|---|
| | Abbreviation | Amount (wt %) | temperature (°C.) | of mold (mm) | (400–800 nm) (%) | (800–1800 nm) (%) |
| Example | | | | | | |
| 32 | ZnPc(PhNH)$_8$Cl$_8$ | 0.03 | 65–90 | 3 | 40.0 | 55.1 |
| 33 | SnCl$_2$Pc[(OctNH)$_4$H$_4$][H$_8$] | 0.015 | " | " | 42.5 | 56.4 |
| 34 | VOPc[(BuNH)$_8$][H$_8$] | 0.01 | " | " | 41.1 | 43.3 |
| 35 | CoPc[(PhNH)$_4$(PhS)$_4$][(PhS)$_8$] | 0.02 | " | " | 33.3 | 60.7 |
| 36 | VOPc[(EtNH)$_4$(PhS)$_4$]((PhS)$_8$] | 0.035 | " | " | 23.8 | 55.1 |
| 37 | VOPc(PhNH)$_8$F$_8$ | 0.005 | " | " | 61.1 | 54.9 |
| 38 | " | 0.01 | " | " | 36.1 | 38.3 |
| 39 | " | 0.02 | " | " | 15.9 | 29.8 |
| 40 | " | 0.013 | " | " | 27.8 | 35.1 |
| Comparative Example | | | | | | |
| 4 | — | — | " | " | 91.8 | 87.9 |
| 5 | — | — | " | " | 70.0 | 15.8 |
| 6 | — | — | 250° C. | " | 79.1 | 74.4 |

Examples 41–42

Compositions prepared by adding the phthalocyanine compounds listed in Table 5 in the amounts listed in Table 5 to the basic recipe for the production of a polyvinyl chloride film consisting of 100 parts by weight of polyvinyl chloride resin, 45.0 parts by weight of dioctylphthalate and 2.5 parts by weight of a Ca—Ba—Zn-type stabilizer, were subjected to a conventional method of calender rolling at a molding temperature of 150° C. to produce polyvinyl chloride films of 0.2 mm thickness. The visible light transmittance and heat light transmittance of the obtained films were measured, and the results are shown in Table 5.

Examples 43–49

To 100 parts by weight of a molten polyethyleneterephthalate resin were added phthalocyanine compounds in the amounts listed in Table 5, and films of 0.1 mm and 0.05 mm thickness were prepared at a molding temperature of 280° C. using an extruder and a film-producing machine. The visible light transmittance and heat radiation transmittance of the obtained films were measured, and the results are shown in Table 5.

TABLE 5

| | Phthalocyanine compound | | Molding | Thickness | Transmittance of visible light rays | Transmittance of heat rays |
|---|---|---|---|---|---|---|
| | Abbreviation | Amount (wt %) | temperature (°C.) | of mold (mm) | (400–800 nm) (%) | (800–1800 nm) (%) |
| Example | | | | | | |
| 41 | VOPc(PhNH)$_8$(O—PhS)$_8$ | 0.5 | 130 | 0.2 | 54.2 | 41.7 |
| 42 | SnCl$_2$Pc(BuNH)$_8$(PhO)$_8$ | 0.5 | 150 | 0.2 | 56.9 | 47.5 |
| 43 | VOPc(PhNH)$_8$(PhS)$_8$ | 0.3 | 280 | 0.1 | 44.0 | 49.1 |
| 44 | " | 1.2 | " | 0.05 | 22.9 | 36.8 |
| 45 | " | 1.8 | " | 0.05 | 15.6 | 34.4 |
| 46 | VOPc(PhNH)$_8$F$_8$ | 0.09 | " | 0.1 | 72.0 | 69.8 |
| 47 | " | 0.3 | " | 0.1 | 35.6 | 42.3 |
| 48 | " | 0.42 | " | 0.05 | 47.3 | 49.7 |
| 49 | " | 1.2 | " | 0.05 | 15.1 | 25.0 |

Reference Example

The thermogravimety (TG) of the phthalocyanine compounds and of commercially available infrared absorbers was carried out using a TG-DTA-2000 manufactured by Mack Science, Inc. The measured values are shown in Table 6.

*Measuring conditions

The measurement was carried out under a nitrogen current. The nitrogen flow rate was 200 ml/min. The rate of temperature increase was 10° C./min up to 150° C., and 5° C./min thereafter. The initial temperature for thermal decomposition was the temperature at the point of intersection of the weight decay curve.

TABLE 6

| Type of infrared absorber | Initial temperature for thermal decomposition (°C.) | Temperature at 5% weight reduction (°C.) | Temperature at 10% weight reduction (°C.) |
|---|---|---|---|
| VOPc(PhNH)$_8$F$_8$ | 328 | 392 | 440 |
| VOPc(PhNH)$_8$(PhS)$_8$ | 308 | 316 | 335 |
| Kayasorb IRG-022 | 263 | 265 | 278 |
| Kayasorb IRG-002 | 267 | 271 | 289 |
| PA-1006 | 262 | 268 | 277 |

Kayasorb IRG-022 (product of Nihon Kayaku, KK.)
  Name of substance: 2,5-cyclohexadiene-1,4-diyridene-bis [N,N-bis(4-dibutylaminophenyl) ammonium]bis (hexafluoroantimonate)
Kayasorb IRG-002 (product of Nihon Kayaku, KK.)
  Name of substance: N,N-bis(4-dibutylaminophenyl)-N-[4-[N,N-bis(4-dibutylaminophenyl) amino]phenyl]-aminium hexafluoroantimonate
PA-1006 (product of Mitsui Toatsu Kagaku, KK.)
  Name of substance: Bis(trichlorobenzene-1,2-dithiol) nickel (2:1) tetrabutylammonium

Examples 50–53

To 100 parts by weight of a molten polycarbonate resin (trade name PANLITE 1285, product of Teijin Kasei, KK.) were added the phthalocyanine compounds listed in Table 7 in the amounts listed in Table 7, carbon black (channel black, average particle size 30 mm) was added thereto in the amounts listed in Table 7, and pellets were prepared at 280° C. using an extruder and a pelletizer. Using the prepared pellets, 3 mm sheets were prepared at molding temperatures of 300° C. and 330° C., using an injection molding machine. The visible light transmittance and heat radiation transmittance of the obtained sheets were measured. The results are shown in Table 7.

radiation-shielding materials according to the present invention clearly exhibited a superior heat radiation-shielding effect while being transparent. In addition, the weatherability test also revealed that the heat radiation-shielding materials according to the present invention can sufficiently withstand practical use. Furthermore, the phthalocyanine compounds to be used according to the present invention are highly soluble in organic solvents, have high compatibility to resins, and have high light fastness and heat resistance, making their application possible in all types of molding methods and providing good uniformity onto resins, and therefore the heat radiation-shielding materials according to the present invention which employ these phthalocyanine compounds may be used in a wide variety of fields.

As is clear from a comparison between Comparative Examples 2 and 3 and the Examples, when dyes are used without the phthalocyanine compounds according to the present invention, there is a reduction only in the visible light transmittance, with no reduction in the heat radiation transmittance.

The fact that the phthalocyanine compounds according to the present invention have excellent heat resistance may be seen from Table 6, and the heat resistance of VOPc(PhNH)$_8$F$_8$ is particularly excellent.

The molding temperature for injection molding, extrusion molding, etc. of transparent, high-strength thermoplastic resins in wide use, such as acrylic resins, polycarbonate resins, PET resins and the like, is 220°–350° C., but practically no infrared absorbers have existed which may be used without the fear of their thermal decomposition at these temperatures. Up to the present, heat radiation-shielding materials have been produced by poorly productive methods such as the casting polymerization of acrylic resins. However, by using the phthalocyanine compounds according to the present invention, molding becomes possible at 220°–350° C., and thus productivity is also improved.

Actually, when the phthalocyanine compounds according to the present invention were used, there was no change in the absorbance wavelength even when the molding tem-

TABLE 7

| Example | Phthalocyanine compound Abbreviation | Amount (wt %) | Molding temperature (°C.) | Thickness of mold (mm) | Transmittance of visible light rays (400–800 nm) (%) | Transmittance of heat rays (800–1800 nm) (%) |
|---|---|---|---|---|---|---|
| 50 | VOPc(PhNH)$_8$F$_8$ + carbon black | 0.005 0.002 | 330 | 3 | 26.4 | 35.6 |
| 51 | VOPc(PhNH)$_8$F$_8$ + carbon black | 0.005 0.0025 | 330 | 3 | 21.3 | 32.0 |
| 52 | VOPc(PhNH)$_8$F$_8$ + carbon black | 0.0075 0.0015 | 300 | 3 | 24.7 | 33.8 |
| 53 | VOPc(PhNH)$_8$F$_8$ + carbon black | 0.010 0.002 | 300 | 3 | 16.5 | 28.0 |

As is clear upon a comparison of the results of measurement of the visible light transmittance and heat radiation transmittance obtained in the Examples with those obtained in the Comparative Examples which contained no phthalocyanine compounds, the heat radiation transmittance values of the Examples were lower without much reduction in the visible light transmittance. In other words, the heat rays were efficiently absorbed and blocked with no interference in the transmittance of visible light. That is, the heat peratures were varied for the molding of the form, as seen from FIG. 1. However, from FIG. 2 it may be seen that when infrared absorbers by various manufacturers were used, a higher molding temperature led to poor heat resistance of the infrared absorber, and therefore the absorbance wavelength was notably attenuated.

Furthermore, although with engineering plastics such as polyacrylates, etc. extremely high molding temperatures of around 400° C. are required, the molding of the phthalocyanine compounds according to the present invention, particularly VOPc(PhNH)$_8$F$_8$, is thought to be possible even at a molding temperature of 400° C.

When Examples 20 and 53, and Examples 21 and 50 are compared, their values of visible light transmittance and heat radiation transmittance are almost equal. However, in Examples 50 and 53, the amounts of the phthalocyanine compounds added are half or less than half those in Examples 21 and 20. In other words, it is shown that by adding carbon black, the amount of the phthalocyanine compound to be used may be reduced.

Example 54

0.1 part by weight of VOPc(PhNH)$_8$F$_8$ was added to 100 parts by weight of molten polyethyleneterephthalate resin, and the resulting mixture was extruded using an extruder and a pelletizer at 280° C. The pellets thus prepared were used to spin fibers, and the fibers were compared with fibers prepared without said phthalocyanine, for heat accumulating and heat insulating effect.

The fibers were wound on a hand, and the hand was exposed to the sunshine, the part of the hand wound with the fibers containing the phthalocyanine felt warm in comparison with the part wound with the fiber not containing the phthalocyanine.

We claim:

1. A method for absorbing heat radiation comprising the steps of:

(1) dissolving into a transparent resin a phthalocyanine compound represented by the following general formula I:

so as to prepare a resin composition into which said phthalocyanine compound has been dissolved, wherein $Z^1$–$Z^{16}$ independently represent $SR^1$, $OR^2$, a hydrogen atom, a halogen atom, or NHY where Y independently represents a phenyl group which may have one or more substituents selected from the group consisting of 1–3 alkyl groups having 1–4 carbon atoms, 1–2 alkoxy groups having 1–4 carbon atoms, 1–2 alkoxycarbonyl groups having 1–8 carbon atoms, and 1–5 halogen atoms, or an alkyl group having 1–8 carbon atoms; $R^1$ and $R^2$ independently represent a phenyl group which may have one or more substituents selected from the group consisting of 1 to 3 alkyl groups having 1 to 4 carbon atoms, 1 or 2 alkoxy groups having 1 to 4 carbon atoms, 1 or 2 alkoxycarbonyl group having 1 to 4 carbon atoms, 1 or 2 alkoxycarbonyl group having 1 to 8 carbon atoms and 1 to 5 halogen atoms or an alkyl group having 1–20 carbon atoms; and M represents metal, metal oxide, metal halide or two hydrogen atoms; provided that at least one of $Z^1$–$Z^{16}$ is NHY;

2) forming the resin composition into a heat radiation-absorbing material, which is semi-transparent or transparent for visible light but blocks heat rays, wherein the content of the phthalocyanine in the material is 0.06 to 2.4 g/m$^2$, and (3) locating the heat radiation absorbing material at a location at which heat radiation absorption is necessary to thereby absorb heat-radiation.

2. A method according to claim 1, wherein at least 6 of $Z^1$ to $Z^{16}$ in the general formula I are NHY.

3. A method according to claim 1, wherein the NHY in the formula (1) is an anilino.

4. A method according to claim 1, wherein at least 9 of $Z^1$ to $Z^{16}$ in the general formula are NHY, $SR^1$, $OR^2$ or halogen atom.

5. A method according to claim 4, wherein at least 4 of $Z^1$ to $Z^{16}$ is halogen atom, or $OR^2$.

6. A method according to claim 1, wherein at least 4 of $Z^2$, $Z^3$, $Z^6$, $Z^7$, $Z^{10}$, $Z^{11}$, $Z^{14}$ and $Z^{15}$ are NHY.

7. A method according to claim 3, wherein at least 6 of $Z^1$ to $Z^{16}$ in the formula (1) are NHY, and at least 4 of them are fluorine atoms.

8. A method according to claim 1, wherein a content of the phthalocyanine compound is in a range of 0.0005–20% by weight based on 100 parts by weight of the resin.

9. A method according to claim 1, wherein the resin is a polycarbonate resin, poly(meth)acrylate resin, polyethylene resin, polyester resin, polystyrene resin or vinyl chloride resin.

10. A method according to claim 1, wherein the material containing the phthalocyanine compound is a resin board, sheet, film, fiber or coating.

11. A method according to claim 1, wherein the heat absorbing material has a heat radiation-shielding function.

12. A method according to claim 1, wherein the heat radiation absorbing material has heat-accumulating and heat-insulating functions.

13. A method according to claim 1, wherein the heat radiation-absorbing material is formed by molding at a temperature of 220° to 350° C.

14. A method according to claim 1, wherein the heat-radiation-absorbing material is formed by cast molding.

15. A method according to claim 1, wherein the resin comprises an acrylic resin, and the heat radiation-absorbing material is formed into an ink or paint and the ink or paint is printed or coated onto a transparent resin board to prepare a heat radiation-shielding sheet.

16. A method according to claim 1, wherein carbon black is added to the resin composition.

17. A method according to claim 16, wherein the heat radiation-absorbing material contains 0.06 g/m$^2$ to 1.2 g/m$^2$ of the phthalocyanine compound and 0.01 g/m$^2$ to 0.3 g/m$^2$ of carbon black.

18. A method according to claim 16, wherein the resin is a polycarbonate resin, (meth)acrylic resin, polystyrene, polyvinyl resin, polyolefin resin, polybutyral resin, vinyl acetate resin, polyester resin, or polyamide resin.

* * * * *